DE WITT NELSON.
TIRE.
APPLICATION FILED JAN. 19, 1907.

1,004,895.

Patented Oct. 3, 1911.

Witnesses

Inventor
DeWitt Nelson.
By
Attorneys

UNITED STATES PATENT OFFICE.

DE WITT NELSON, OF MINNEAPOLIS, MINNESOTA, ASSIGNOR TO E. J. PHELPS, OF MINNEAPOLIS, MINNESOTA.

TIRE.

1,004,895.  Specification of Letters Patent.  Patented Oct. 3, 1911.

Application filed January 19, 1907. Serial No. 353,152.

*To all whom it may concern:*

Be it known that I, DE WITT NELSON, citizen of the United States, residing at Minneapolis, in the county of Hennepin and State of Minnesota, have invented certain new and useful Improvements in Tires, of which the following is a specification.

It frequently becomes necessary, particularly when riding upon the highway out some distance from a thickly settled place, to improvise means for preventing serious injury to a pneumatic tire after the same has collapsed from puncture, or other cause.

The present invention aims to fill this want by providing an emergency tire which may be readily fitted to any wheel of the vehicle after the disabled tire has been removed, thereby enabling the machine, or vehicle, to continue on its journey. The emergency tire is of sectional formation, the sections either being hinged or made separable and adapted to be connected in any substantial way when it is required to place the tire in position.

For a full description of the invention and the merits thereof and also to acquire a knowledge of the details of construction of the means for effecting the result, reference is to be had to the following description and accompanying drawings.

Figure 1:
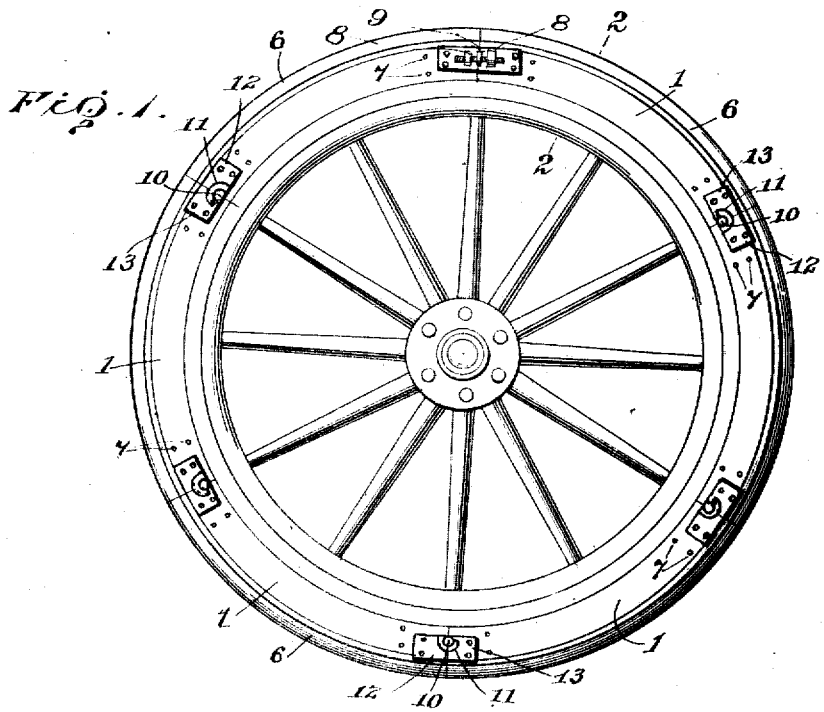
Figure 2:
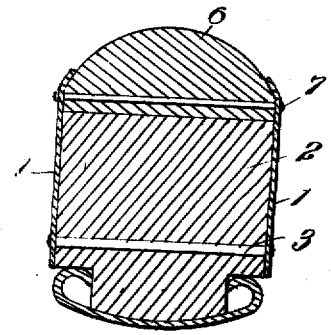
Figures 3, 4:
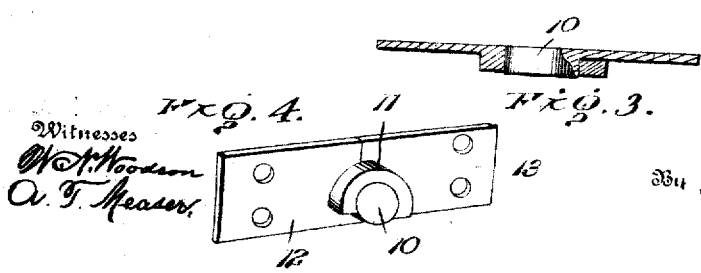

While the invention may be adapted to different forms and conditions by changes in the structure and minor details without departing from the spirit or essential features thereof, still the preferred embodiment is shown in the accompanying drawings, in which:

Figure 1 is a side view of a vehicle wheel provided with a tire embodying the invention. Fig. 2 is a sectional view on line 2—2 of Fig. 1. Fig. 3 is a detail view of the connecting means between adjacent tire sections. Fig. 4 is a detail perspective view of the parts shown in Fig. 3.

Corresponding and like parts are referred to in the following description and indicated in all the views of the drawings by the same reference characters.

The tire is composed of like sections which are so connected as to admit of the tire being reduced to compact form. Each of the sections is curved longitudinally to conform to the circumference of the wheel for which the tire is designed. While the sections may be formed of any suitable material, it is preferred to construct the same of wood which is light, cheap and possessed of a certain amount of resiliency so as to neutralize shock and vibration. As indicated in Fig. 2, the body portion of the sections is formed of wood and the tread portion is constructed of rubber, leather, wood fiber or other material to provide a yieldable tread portion. Metallic plates 1 whatever be their form are fitted to opposite sides of the sections 2 whatever be their form and are secured thereto by means of bolts, rivets, or like fastenings 3 passed through transversely alined openings in the plates 1 and body portion of the sections. The side plates 1 may be light and give strength to the sections and provide substantial means for the joint formed between said sections. When the tire is designed for a vehicle wheel having a rim of the clencher type, the inner portion of the sections is constructed so as to fit between the recurved portions of the clencher rim 4 of the vehicle wheel as indicated most clearly in Fig. 2. When the sections of the tire are provided with a tread portion 6 of leather, rubber, or like material, the side plates 1 are preferably extended outward from the body of the section so as to embrace edge portions of the tread portion 6, said projecting portions of the side plates being apertured to receive fastenings 7 of any suitable type. The sections are of such curvature and relative length that when assembled they unitedly form a tire which fits about, or conforms to, the circumference of the vehicle wheel for which designed. Lateral lugs 8 are provided at the ends of the tire and are apertured to receive a bolt 9 with right and left-hand threads by means of which said tire is drawn close about the rim of the wheel. By having the lugs 8 located at one side of the tire, they do not come in contact with the surface over which the vehicle may move, and moreover, the strain exerted for drawing the tire snug about the wheel is sustained by the metallic side plates 1 to which said lugs 8 are attached.

The sections 2 are adapted to be jointed in a way to admit of either folding or being readily separated so as to be stowed in a small space, each of the joints comprising a lug 10 and a hook 11, said parts being formed with plates 12 and 13 which are riveted, or otherwise secured to the end portions of the side plates 1. After the sections have been coupled and the tire fitted to the rim of the wheel, the parts 10 and 11 interlock and are prevented from accidental displacement. While the coupling bars 10 and 11 are preferably separate from and attached to the side plates 1, yet it is to be understood that they may form a part of said plates.

When a pneumatic tire of the wheel of an automobile, or like road machine, becomes crippled, it may be removed and replaced by the tire herein described, it being understood that the tire is of such construction as to fit any wheel of the machine. The tire being practically of wood, will compensate in a measure for vibration and render riding comparatively easy, much more so than would be experienced by riding dirctly upon the rim of the wheel not taking into account the injury which would result to the tire if the same were left upon the wheel.

I do not limit myself to the details of construction shown and described as the same may be varied in many particulars without departing from my invention.

It will be observed (see Fig. 1) that the interchangeable sections have flattened square ends so that one section will abut squarely or fit snugly against the adjoining section and when drawn and interlocked together form substantially a continuous rigid ring, which is practically self-sustaining.

Having thus described the invention, what is claimed as new is:

1. A tire of the character set forth, comprising a series of corresponding sections, reinforcing plates applied to the opposite sides of the sections, and second plates secured to the reinforcing plates and carrying means for detachably connecting the sections.

2. A tire of the character set forth, comprising a series of sections, a resilient tread, reinforcing plates applied to opposite sides of the sections and extending outwardly to embrace the tread, and means carried by the reinforcing plates for detachably connecting the sections.

3. A tire of the character set forth, comprising a series of corresponding sections having the inner edges thereof cut away to receive the side flanges of the rim, a tread portion carried by each of the sections, reinforcing plates applied to opposite sides of each of the sections and projecting outwardly to embrace the tread, and means carried by the reinforcing plates for detachably connecting the sections.

4. A tire of the character set forth, comprising a series of corresponding sections having the inner edges thereof cut away to receive the side flanges of a wheel rim, a tread portion carried by each of the sections, reinforcing plates applied to the opposite sides of the sections and extending outwardly to embrace the tread, and coöperating hooks and lugs carried by the reinforcing plates for detachably connecting the sections.

5. In an emergency tire, a rim formed of sections movably connected together, a tire section secured to each rim section, and means carried by said rim to detachably fasten said rim on a vehicle wheel in place of the ordinary tire.

6. In an emergency tire, a rim formed of sections, a tire section secured to each rim section, connections between said rim sections, and means between two adjacent sections for clamping said rim on a vehicle wheel.

7. In an emergency tire, a rim formed of sections, a tire section secured to each rim section, a lug on two adjacent sections, connections between the remaining rim sections, a worm securing said lugs together, and means to rotate said worm, whereby said rim may be fastened to a vehicle wheel in place of the ordinary tire.

In testimony whereof I affix my signature in presence of two witnesses.

DE WITT NELSON. [L. S.]

Witnesses:
J. E. Cox,
Thomas Watts.